United States Patent
Sawal et al.

(10) Patent No.: US 12,470,408 B2
(45) Date of Patent: Nov. 11, 2025

(54) PROXY ATTESTATION SERVICE FOR MULTI-CLOUD TEE HARDWARE

(71) Applicant: Dell Products L.P., Round Rock, TX (US)

(72) Inventors: Vinay Sawal, Fremont, CA (US); Viswanath Ponnuru, Bangalore (IN); Sumanth Vidyadhara, Bangalore (IN); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 18/423,035

(22) Filed: Jan. 25, 2024

(65) Prior Publication Data
US 2025/0247255 A1  Jul. 31, 2025

(51) Int. Cl.
  *H04L 29/06* (2006.01)
  *H04L 9/08* (2006.01)
  *H04L 9/32* (2006.01)

(52) U.S. Cl.
  CPC ............ *H04L 9/3271* (2013.01); *H04L 9/083* (2013.01)

(58) Field of Classification Search
None
See application file for complete search history.

(56) References Cited

U.S. PATENT DOCUMENTS

2022/0131695 A1* 4/2022 Pike .................. H04L 9/14
2024/0195868 A1* 6/2024 Sheth ............... H04L 61/4511

FOREIGN PATENT DOCUMENTS

WO  WO-2024074207 A1 *  4/2024  ............ H04W 12/04

* cited by examiner

*Primary Examiner* — Andrew J Steinle
(74) *Attorney, Agent, or Firm* — Workman Nydegger

(57) ABSTRACT

One example method includes receiving, by a distributed attestation proxy server (DAPS) from a client, an attestation request, establishing, by the DAPS, a secure communication channel with the client, performing, by the DAPS, a resource discovery process to identify a resource that meets a requirement of the client, facilitating, by the DAPS, an attestation exchange between the client and the resource, performing, by the DAPS, a verification and attestation process that comprises generation of an attestation result, transmitting, by the DAPS, the attestation result to the client, and when the attestation result is positive, establishing, by the DAPS, a secure communication channel between the client and the resource.

20 Claims, 3 Drawing Sheets

PROXY ATTESTATION SERVICE FOR MULTI-CLOUD TEE HARDWARE

FIELD OF THE INVENTION

Embodiments of the present invention generally relate to enabling a client to access its cloud based assets. More particularly, at least some embodiments of the invention relate to systems, hardware, software, computer-readable media, and methods, for enabling disparate clients, with disparate cloud assets, to use a common and consistent approach to access those assets in a secure manner.

BACKGROUND

Confidential computing (CC) protects data and code in a hardware-based trusted execution environment (TEE) by providing various features, such as: integrity—the CC partitions physical memory and guarantees that only authorized entities can access specific memory regions; confidentiality—the CC uses hardware-enhanced memory encryption engines to prevent attackers from probing memory contents-however, in cloud environments, such as Amazon S3 for example, virtualization is utilized for cost reduction and minimizing hardware dependency, necessitating trust in the privileged hypervisor for customers using this TEE; and remote attestation—this provides verifiable evidence of the authenticity of the underlying hardware and current execution state. With remote attestation, cloud customers can confirm the secure execution of their sensitive code within a legitimate TEE hosted in the cloud.

Multi-cloud computing involves integrating multiple clouds to collaborate on computing tasks, offering economic advantages and avoiding dependence on a single cloud provider. Confidential computing is employed to eliminate the need to trust specific cloud vendors and establish a secure joint cloud. Cloud providers offer various CC abstractions but these abstractions typically differ, often from client to client, in terms of their assumptions and approaches, even for similar infrastructures. Thus, cloud computing faces security challenges, particularly in establishing trust among different clouds.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
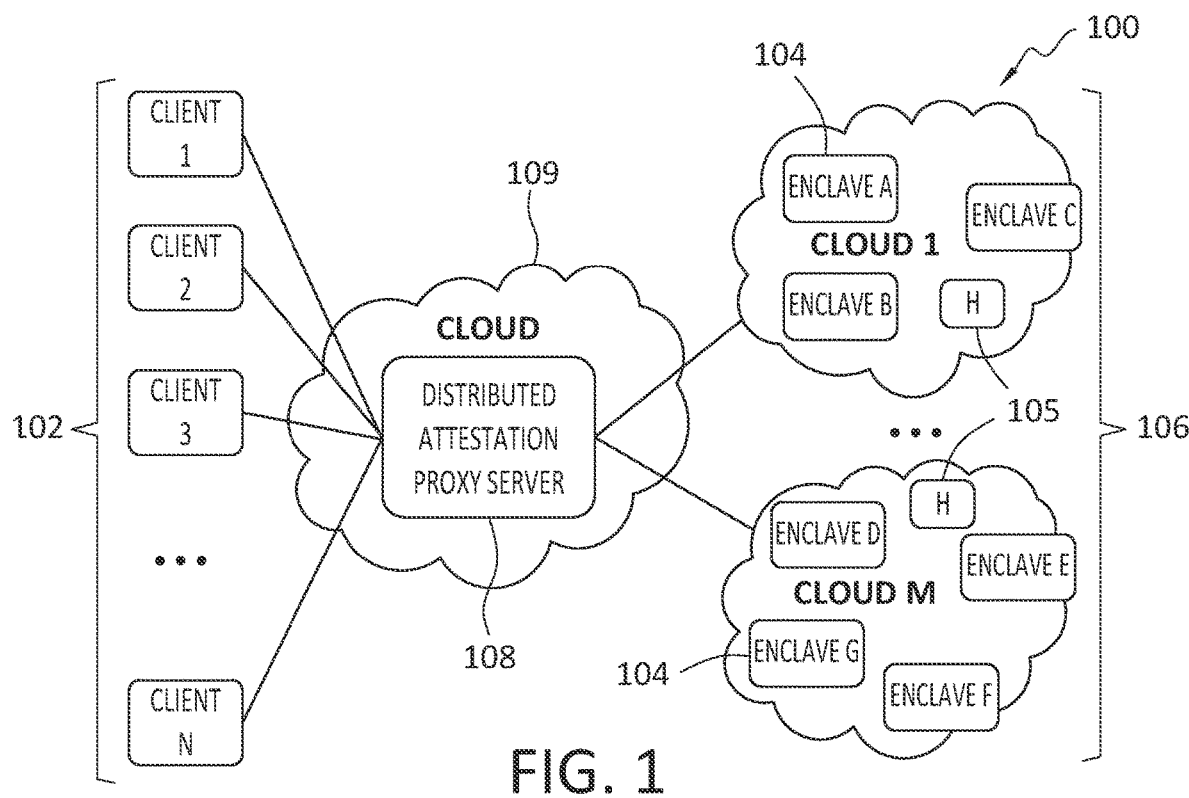
FIG. 1 discloses aspects of an example architecture according to one embodiment.

Embodiments of the present invention generally relate to enabling a client to access its cloud based assets. More particularly, at least some embodiments of the invention relate to systems, hardware, software, computer-readable media, and methods, for enabling disparate clients, with disparate cloud assets, to use a common and consistent approach to access those assets in a secure manner.

Addressing the disparities in abstractions, attestation techniques, and security guarantees may be important to bridge the gap and ensure a cohesive and secure joint cloud environment. At present, there is no uniform attestation abstraction layer for managing per-cloud per-CC resource. Thus, an embodiment may facilitate the execution of Confidential Computing (CC) applications across clouds while maintaining transparency for users.

One example embodiment comprises a method, which may be implemented by a proxy attestation service operating in connection with a multi-cloud environment. This example method may comprise the following operations: [1] a client initiates an attestation request to a distributed attestation proxy server (DAPS); [2] the DAPS establishes a secure communication channel with the client; [3] the DAPS performs resource discovery for the client; [4] the DAPS identifies and applies a policy that may specify a required level of trust and security between the client and the resource; [5] the DAPS facilitates a challenge-and-response exchange between the client and the resource, which may comprise a remote server; [6] if the client passes a verification process, the DAPS generates an attestation result, which may be relayed to the client, indicating that the resource is trustworthy according to the policy; and [7] the client can then interact with the resource.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that customization and flexibility may be provided to clients by abstracting remote attestation functionality between the clients and cloud service provider assets and resources. An embodiment may integrate with existing cloud orchestration platforms and vendor equipment that may have a variety of different hardware capabilities. An embodiment may provide enhanced security for client usage of cloud resources. Various other advantages of one or more example embodiments will be apparent from this disclosure.

A. Aspects of an Example Architecture According to One Embodiment

The following is a discussion of aspects of example architecture according to one embodiment. This discussion is not intended to limit the scope of the invention, or the applicability of the embodiments, in any way.

An embodiment may implemented in a multi-cloud environment that includes multiple clouds, one of which may comprise a cloud computing environment, and one or more clients may access, such as by way of a distributed attestation proxy server (DAPS) according to one embodiment, respective resources hosted in one of the clouds. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Particularly, devices in a cloud computing environment may take the form of software, physical machines and other hardware, or VMs, or any combination of these, though no particular device implementation or configuration is required for any embodiment. Similarly, components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

With particular attention now to FIG. 1, one example of an architecture according to one embodiment is denoted generally at 100. In general, the architecture 100 may comprise one or more clients 102, that may access resources 104 hosted in one or more cloud environments 106, by way of a DAPS 108 that may be hosted in a cloud environment 109, such as a Dell APEX cloud environment for example. In an embodiment, the clients 102 may each be located at a respective cloud site, or user premises. The resources 104 may comprise, but are not limited to, a TEE (trusted execution environment) such as an enclave, in which a client 102 may be able to run processes and applications, for example. A resource 104 may comprise hardware and/or software, and may be managed by a hypervisor 105. A client 102 may access more than one of the resources 104. In one embodiment, a resource 104 may be associated with only a single client 102, and that resource 104 may not be accessible by any other client(s) 102.

In more detail, the DAPS 108 may act as an intermediary or facilitator for remote attestation processes between the clients 102 and a server at the cloud site 106 hosting a resource 104 such as TEE or enclave. One role of the DAPS 108 is to enable secure communication and verification with a client 102 and resource 104 during an attestation process, and to enable secure communication between a client 102 and the resource 104 upon successful attestation.

In brief, an example workflow involving a client 102 and the DAPS 108 may proceed as follows: [1] the client 102 initiates an attestation process by requesting verification of the resource 104, such as a TEE or enclave running on a remote server in the cloud environment 106 this request by the client 102 may be served by the DAPS 108; [2] the DAPS 108 may establish a secure communication channel between the client 102 and the server hosting the resource 104 in the cloud environment 106; [3] the DAPS 108 may act as an intermediary for exchanging challenges and responses between the client 102 and the remote server that hosts the resource 104; [4] the DAPS 108 may then verify the responses received from the resource 104 on the remote server of the cloud environment 106—the DAPS 108 may then provide the attestation result back to the client 102, and the results may confirm whether the resource 104 is genuine, trusted, and running the code expected by the client 102.

B. Aspects of an Example DAPS According to One Embodiment

Figure 2:
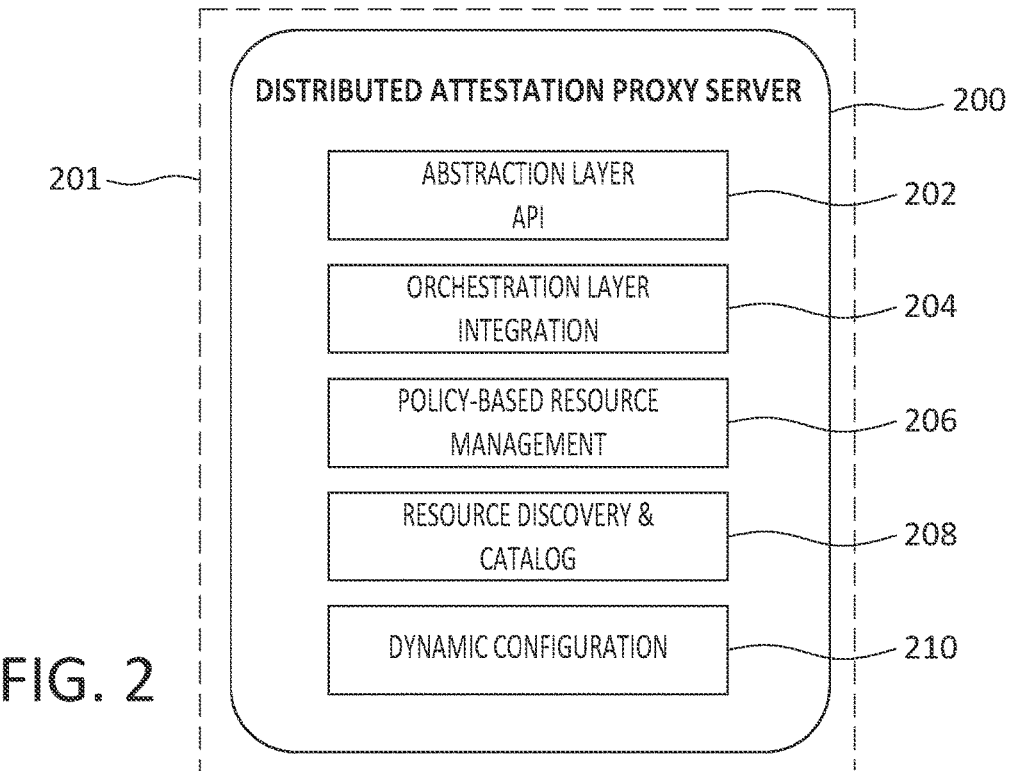
FIG. 2 discloses aspects of an example distributed attestation proxy server according to one embodiment.

With reference now to FIG. 2, an example DAPS 200 according to one embodiment is disclosed. In an embodiment, the DAPS 200 may comprise an element of an abstraction layer 201 with which the clients 102, resources 104, hypervisors 105, and cloud environments 106 may communicate. In an embodiment, a DAPS 200 may comprise various features and functionalities. Some examples of these are discussed below.

B.1 Abstraction layer

In an embodiment, the DAPS 200 may serve as the core of the abstraction layer 201, and may abstract the complexities of attestation processes away from the client 102 and a resource 104 (see FIG. 1) such as a TEE/enclave, providing a standardized interface to each of the clients 102. The DAPS 200 may thus comprise APIs 202 that may enable a uniform and well-defined set of functions for initiating attestation, verifying responses, and managing attestation policies. This abstraction function may simplify interactions between the DAPS 200, clients 102, and various resources 104 and cloud service providers in the cloud environments 106.

B.2 Integration with Cloud Orchestration

In an embodiment, the DAPS 200 may be made compatible, such as by way of an orchestration layer 204 of the DAPS 200, with cloud orchestration platforms and frameworks such as Kubernetes and OpenStack. This configuration may enable seamless deployment, scaling, and management of attestation processes within the orchestration framework. An embodiment may leverage orchestration features to auto-scale the DAPS 200 based on demand, ensuring that the DAPS 200 may be able to handle varying workloads efficiently.

B.3 Policy-Based Management of Attestation Processes

In an embodiment, a policy engine 206, which may comprise policy-based resource management, may be implemented within the DAPS 200. The policy engine 206 may enable administrators to define attestation policies. These policies may specify, for example, the required security levels, allowed client identities, and other attestation parameters. These policies may be enforced during an attestation process, so as to help ensure that only attestation requests that meet the defined criteria are processed.

B.4 Resource Discovery

In an embodiment, the DAPS 200 may comprise a resource discovery mechanism 208 that may enable the DAPS 200 to discover available TEEs or enclaves across different cloud providers to build a resource catalog. The resource discovery mechanism 208 may gather information about the TEE/enclave capabilities, attestation methods, and supported algorithms. This can involve periodic scans or querying cloud provider APIs. This information may be used by the DAPS 200 to match resources 104 (see FIG. 1) with attestation requirements defined in policies of the policy engine 206.

B.5 Dynamic Configuration

In an embodiment, the DAPS 200 may comprise a dynamic configuration mechanism 210 that may operate to implement, possibly dynamically, updates to attestation policies based on changing security needs or compliance requirements. In an embodiment, the DAPS 200 may adapt to new policies without requiring a system restart. An embodiment of the DAPS 200 may implement resource-specific configuration, allowing different resources to have tailored attestation settings based on their unique security profiles or workload requirements.

C. Aspects of an Example Method According to One Embodiment

It is noted with respect to the disclosed methods, including the example method of FIG. 3, discussed below, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
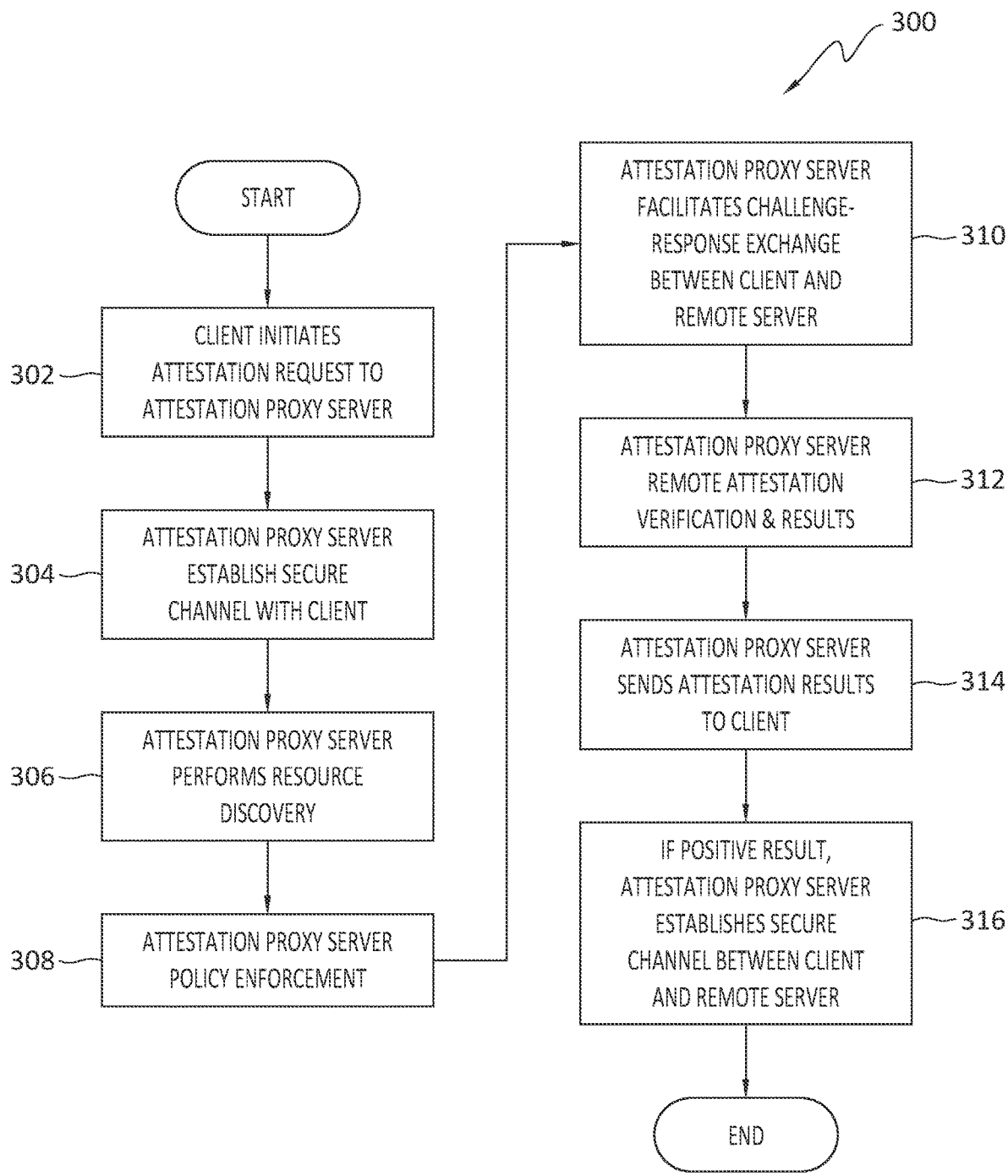
FIG. 3 discloses an example method according to one embodiment.

Directing attention now to FIG. 3, a method according to one embodiment is denoted generally at 300. The example end-to-end workflow of the method 300 indicates how a client, such as the client 102 for example, may securely establish trust, and interact, with a resource, such as the resource 104 for example, that may comprise a remote TEE or enclave, in a confidential computing environment while leveraging the capabilities of a DAPS, such as the DAPS 200 for example, for security, and for policy enforcement. Thus, part, or all, of the example method 300 may be implemented by, and/or at the direction of, a DAPS according to one embodiment.

The example method 300 may begin when a client which intends to interact with a remote server hosting a resource such as a TEE or enclave, initiates the attestation process. As part of this initiation, the client sends an attestation request 302 to the DAPS. In an embodiment, the attestation request may comprise information such as the identity of the requesting client, the expected level of security, and the TEE or enclave that the client intends to communicate with.

Next, the DAPS, upon receiving the request 302, may establish 304 a secure communication channel with the client. In an embodiment, establishment of the communication channel may involve using cryptographic protocols, such as TLS (Transport Layer Security) for example, to ensure the confidentiality and integrity of data in transit between the DAPS and the client.

The DAPS may then perform resource discovery 306 to identify available TEEs or enclaves, and/or other resources, that match the requirements of the client. In an embodiment, the DAPS may query cloud providers or resource catalogs to gather information about resources that may be available to the client.

Next, the DAPS may enforce policy-based management 308. For example, the DAPS may check the client attestation request against predefined policies that specify a required level of trust and security. Policies may also define which TEEs, enclaves, or other resources, are suitable for the purposes of the client.

In an embodiment, the DAPS may act as an intermediary 310 for exchanging cryptographic challenges and responses between the client and the remote server hosting the TEE, enclave, or other resource. The challenges may be sent by the client to the TEE, enclave, or other resource, by way of the DAPS, and responses may be generated by the TEE or enclave.

After receiving the responses from the TEE or enclave, the DAPS may perform a verification/attestation process 312. In an embodiment, the DAPS may check the evidence, such as metadata for example, provided in the responses to ensure that the TEE or enclave is genuine, trusted, and running the expected code. The verification/attestation process 312 may include generation, by the DAPS, of an attestation result based on the verification process. This result confirms whether, or not, the TEE or enclave is trustworthy according to the defined policies.

Next, the attestation result may be relayed 314 by the DAPS back to the client over the secure communication channel that was established by the DAPS earlier. The client may then receive the result, and can then make a decision, based on the attestation result, as to whether or not to trust the system, that is, the resource such as an enclave or TEE for example, that the client intends to interact with.

Finally, if the attestation result is positive, indicating that the TEE or enclave is trusted, the DAPS may establish 316 a secure communication channel between the client and the resource so as to enable the client to proceed with secure communication and data exchange with the remote server resource, such as the TEE or enclave. In an embodiment, the DAPs may dynamically update policies and configurations based on changing security requirements or resource availability. This flexibility of the DAPS may help to ensure adaptability of the DAPS to evolving needs and constraints.

D. Further Discussion

As apparent from this disclosure, an embodiment may possess various useful features and aspects, although no embodiment is required to possess any of such features or aspects. The following are provided by way of example.

An embodiment may comprise a full-feature attestation proxy service that provides customization and flexibility in abstracting remote attestation functionality between clients and cloud service providers. As another example, an embodiment may implement seamless integration with cloud orchestration platforms and vendor equipment with varying hardware capabilities. Finally, an embodiment may comprise enhanced security features with an additional layer of access control, threat detection, and real-time policy updates for better security.

E. Further Example Embodiments

Following are some further example embodiments of the invention. These are presented only by way of example and are not intended to limit the scope of the invention in any way.

Embodiment 1

A method, comprising receiving, by a distributed attestation proxy server (DAPS) from a client, an attestation request; establishing, by the DAPS, a secure communication channel with the client; performing, by the DAPS, a resource discovery process to identify a resource that meets a requirement of the client; facilitating, by the DAPS, an attestation exchange between the client and the resource; performing, by the DAPS, a verification and attestation process that comprises generation of an attestation result; transmitting, by the DAPS, the attestation result to the client; and when the attestation result is positive, establishing, by the DAPS, a secure communication channel between the client and the resource.

Embodiment 2

The method as recited in any preceding embodiment, wherein the resource comprises an enclave, or a trusted execution environment (TEE).

Embodiment 3

The method as recited in any preceding embodiment, wherein the resource is hosted on a server in a cloud environment that also comprises a resource that meets another requirement of another client.

Embodiment 4

The method as recited in any preceding embodiment, wherein the DAPS abstracts the attestation exchange as among multiple clients, including the client, and among multiple cloud service providers.

Embodiment 5

The method as recited in any preceding embodiment, wherein the DAPS communicates with a cloud orchestration platform by way of an orchestration layer of the DAPS.

Embodiment 6

The method as recited in any preceding embodiment, wherein, as part of the verification and attestation process, the DAPS enforces a policy so as to ensure that only attestation requests that meet defined criteria are processed.

Embodiment 7

The method as recited in any preceding embodiment, wherein the resource discovery process spans multiple cloud sites.

Embodiment 8

The method as recited in any preceding embodiment, wherein the DAPS dynamically implements a change to an attestation policy that applies to the client.

Embodiment 9

The method as recited in any preceding embodiment, wherein the attestation exchange comprises a challenge-and-response exchange between the client and the resource, and the challenge-and-response exchange is passed between the client and the resource by way of the DAPS.

Embodiment 10

The method as recited in any preceding embodiment, wherein when the attestation result is negative, the secure communication channel between the client and the resource is not established by the DAPS.

Embodiment 11

A system, comprising hardware and/or software, operable to perform any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
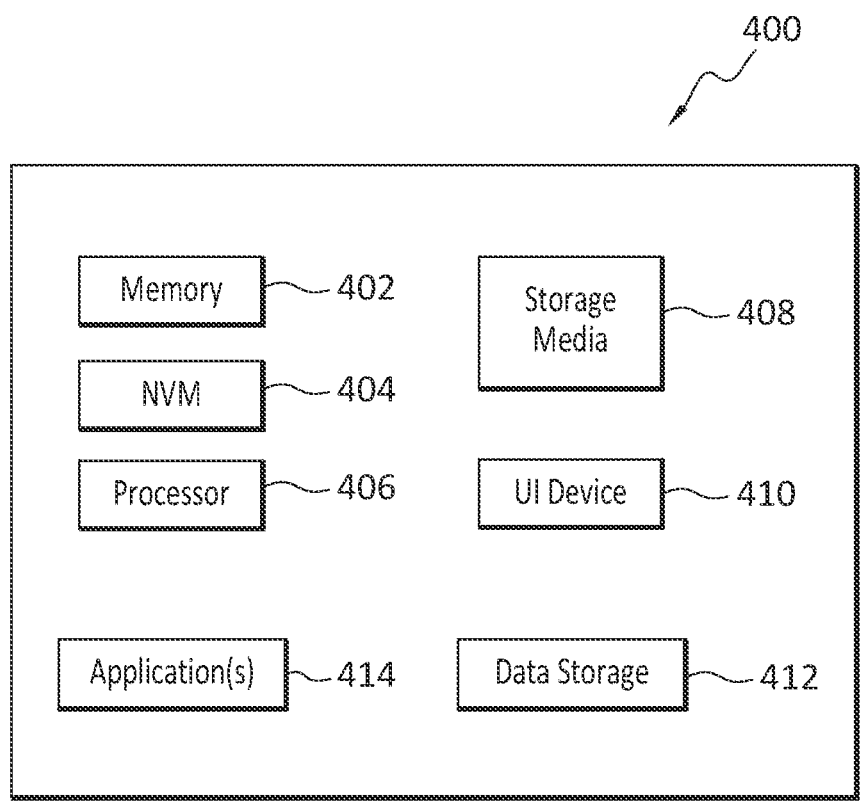
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 402 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, by a distributed attestation proxy server (DAPS) from a client, an attestation request;
establishing, by the DAPS, a secure communication channel with the client;
performing, by the DAPS, a resource discovery process to identify a resource that meets a requirement of the client;
facilitating, by the DAPS, an attestation exchange between the client and the resource;
performing, by the DAPS, a verification and attestation process that comprises generation of an attestation result;
transmitting, by the DAPS, the attestation result to the client; and
when the attestation result is positive, establishing, by the DAPS, a secure communication channel between the client and the resource.

2. The method as recited in claim 1, wherein the resource comprises an enclave, or a trusted execution environment (TEE).

3. The method as recited in claim 1, wherein the resource is hosted on a server in a cloud environment that also comprises a resource that meets another requirement of another client.

4. The method as recited in claim 1, wherein the DAPS abstracts the attestation exchange as among multiple clients, including the client, and among multiple cloud service providers.

5. The method as recited in claim 1, wherein the DAPS communicates with a cloud orchestration platform by way of an orchestration layer of the DAPS.

6. The method as recited in claim 1, wherein, as part of the verification and attestation process, the DAPS enforces a policy so as to ensure that only attestation requests that meet defined criteria are processed.

7. The method as recited in claim 1, wherein the resource discovery process spans multiple cloud sites.

8. The method as recited in claim 1, wherein the DAPS dynamically implements a change to an attestation policy that applies to the client.

9. The method as recited in claim 1, wherein the attestation exchange comprises a challenge-and-response exchange between the client and the resource, and the challenge-and-response exchange is passed between the client and the resource by way of the DAPS.

10. The method as recited in claim 1, wherein when the attestation result is negative, the secure communication channel between the client and the resource is not established by the DAPS.

11. A non-transitory storage medium having stored therein instructions that are executable by one or more hardware processors to perform operations comprising:
   receiving, by a distributed attestation proxy server (DAPS) from a client, an attestation request;
   establishing, by the DAPS, a secure communication channel with the client;
   performing, by the DAPS, a resource discovery process to identify a resource that meets a requirement of the client;
   facilitating, by the DAPS, an attestation exchange between the client and the resource;
   performing, by the DAPS, a verification and attestation process that comprises generation of an attestation result;
   transmitting, by the DAPS, the attestation result to the client; and
   when the attestation result is positive, establishing, by the DAPS, a secure communication channel between the client and the resource.

12. The non-transitory storage medium as recited in claim 11, wherein the resource comprises an enclave, or a trusted execution environment (TEE).

13. The non-transitory storage medium as recited in claim 11, wherein the resource is hosted on a server in a cloud environment that also comprises a resource that meets another requirement of another client.

14. The non-transitory storage medium as recited in claim 11, wherein the DAPS abstracts the attestation exchange as among multiple clients, including the client, and among multiple cloud service providers.

15. The non-transitory storage medium as recited in claim 11, wherein the DAPS communicates with a cloud orchestration platform by way of an orchestration layer of the DAPS.

16. The non-transitory storage medium as recited in claim 11, wherein, as part of the verification and attestation process, the DAPS enforces a policy so as to ensure that only attestation requests that meet defined criteria are processed.

17. The non-transitory storage medium as recited in claim 11, wherein the resource discovery process spans multiple cloud sites.

18. The non-transitory storage medium as recited in claim 11, wherein the DAPS dynamically implements a change to an attestation policy that applies to the client.

19. The non-transitory storage medium as recited in claim 11, wherein the attestation exchange comprises a challenge-and-response exchange between the client and the resource, and the challenge-and-response exchange is passed between the client and the resource by way of the DAPS.

20. The non-transitory storage medium as recited in claim 11, wherein when the attestation result is negative, the secure communication channel between the client and the resource is not established by the DAPS.

* * * * *